Figure 1:
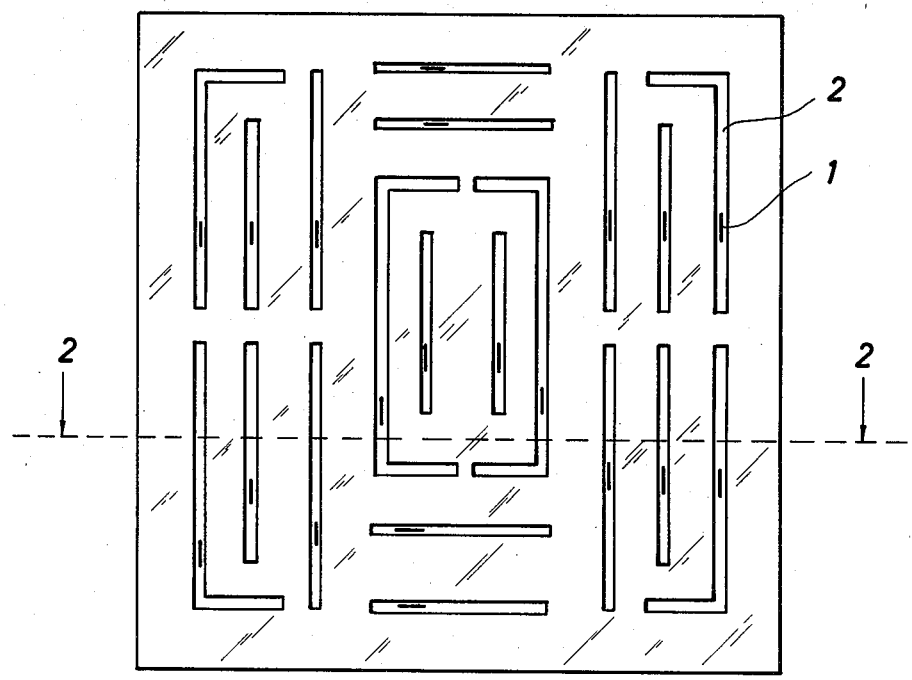

United States Patent [19]

Nygaard

[11] 4,378,155
[45] Mar. 29, 1983

[54] SUCTION FILM HOLDER

[75] Inventor: Sven Nygaard, Tåstrup, Denmark

[73] Assignee: Eskofot A/S, Ballerup, Denmark

[21] Appl. No.: 251,939

[22] Filed: Apr. 7, 1981

[30] Foreign Application Priority Data

Apr. 16, 1980 [DK] Denmark .............................. 1611/80

[51] Int. Cl.³ ............................................. G03B 27/60
[52] U.S. Cl. ........................................ 355/73; 355/76
[58] Field of Search .................... 355/73, 76; 248/362; 354/276

[56] References Cited

U.S. PATENT DOCUMENTS

| 2,694,337 | 11/1954 | Anander | 355/73 |
| 3,307,816 | 3/1967 | Cocito | 355/73 X |
| 3,307,817 | 3/1967 | Cocito | 355/73 X |
| 3,307,818 | 3/1967 | Cocito | 355/73 X |
| 3,307,819 | 3/1967 | Cocito | 355/73 X |

Primary Examiner—Richard A. Wintercorn
Attorney, Agent, or Firm—Michael Ebert

[57] ABSTRACT

A suction film holder preferably for a reproduction camera and comprising a plate with channels opening outwards and communicating with a suction means. The known suction holders comprise a plurality of concentric chambers mutually communicating through valves, only the intermediary chamber being connected to the suction source. The sheet in question may therefore neither be of an arbitrary size nor be arbitrarily located. According to the invention the channels uniformly dispersed across the entire plate are individually connected to the suction means through at least one valve, said valve closing when a heavy flow takes place and slightly opening when substantially the same pressure is present on both sides thereof. In this manner the sheet may have an arbitrary size and be arbitrarily located. A plurality of channels always open on to the back of the sheet, the valves of said channels slightly opening when substantially the same pressure is present on both sides of the valve, i.e. a low pressure retaining the sheet. The valves located in the channels opening on outside the sheet close.

2 Claims, 3 Drawing Figures

SUCTION FILM HOLDER

The invention relates to a suction film holder preferably for a reproduction camera and comprising a plate with grooves or channels opening outwards and communicating with a suction means.

Such a suction film holder serves to retain either an original or a reproduction sheet during the printing.

DE-PS No. 2,302,757 discloses a suction film holder for cameras. This suction film holder comprises a plurality of conical suction chambers mutually communicating through valves. However, the sheet in question may neither be of arbitrary size nor be arbitrarily located. Only the intermediary suction chamber is connected to the suction source.

The object of the invention is to provide a suction film holder permitting an arbitrary location of a sheet of an arbitrary size without a disproportionate high number of valves.

The suction film holder according to the invention is characterized by the channels being individually connected to the suction means through at least one valve, said valve closing when a heavy flow takes place and slightly opening when substantially the same pressure is present on both sides thereof.

As a result, the sheet may be of an arbitrary shape and size to a predetermind maximum size and be arbitrarily located. A plurality of channels always open on to the back of the sheet, the valves of said channels slightly opening since substantially the same pressure is present on both sides of the valve, i.e. a low pressure retaining the sheet. A plurality of valves located in the channels outside the sheet close. A further advantage is that only relatively few valves are necessary.

According to the invention the valves may be composed of flat springs adjusted so as to permit a predetermined minimum flow in the closed position.

Figure 2:
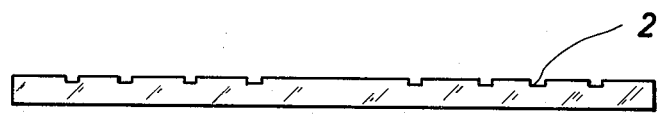
Figure 3:
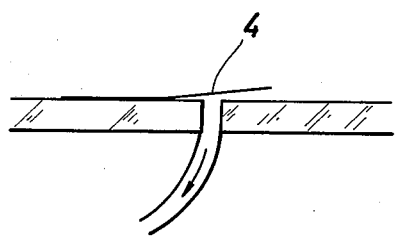

The invention will be described below with reference to the accompanying drawing, in which FIG. 1 is a top view of a suction film holder according to the invention, FIG. 2 is a sectional view of the suction film holder of FIG. 1, and FIG. 3 illustrates one of the valves in one of the suction channels.

The suction film holder illustrated in FIG. 1 preferably for a reproduction camera comprises a plate with grooves or channels 2 opening outwards. Each channel communicates with a suction means preferably through a valve 1. Each channel 2 is connected to the suction means through preferably one valve in the form of a flat spring 4 in the bottom of the channel, cf. FIG. 3. This flat spring closes when a heavy flow takes place, i.e. when the channel 2 is uncovered, cf. FIG. 2, and opens slightly when substantially the same pressure is present on both sides thereof. In the latter position the channel is covered by a sheet which is sucked to the film holder.

The film holder illustrated in FIG. 1 comprises a high number of channels uniformly dispersed across the plate, said channels providing the advantage that a sheet of almost any size and orientation may be sucked to the holder.

The flat spring closes under usual circumstances, although a slight oozing occurs. By locating the sheet above the channel, the channel is sucked out and the flat spring 4 opens, whereby the sheet, e.g. a sheet of light-sensitive material, is secured.

The suction film holder may for instance be made of plexiglass, said holder being simple and inexpensive to manufacture.

I claim:

1. A suction film holder usable in a reproduction camera to hold film sheets of various sizes, said holder comprising:

A a plate whose dimensions are large enough to accommodate any one of said film sheets regardless of its size and orientation on the plate, said plate having uniformly dispersed thereacross an array of elongated narrow channels which are indented in the face of the plate underlying the sheet to be held, each channel being provided with a bore extending from the bed of the channel through the plate, which bore is coupled to a suction source; and B a valve disposed in each channel constituted by a flat spring overlying the bore, said valve being adjusted so that when the channel is exposed, the resultant heavy air flow causes the spring to close the bore; and when the channel is covered by the sheet, the spring is then caused to be raised slightly over the bore to an extent producing substantially the same air pressure on both sides of the spring, in which state the sheet is held by low pressure suction to the plate.

2. A holder as set forth in claim 1, wherein said plate is fabricated of plexiglass.

* * * * *